Feb. 4, 1964    W. LITTLE III    3,120,164
HOLDER FRAME AND JIG STRUCTURES FOR PHOTOGRAPHIC
FILMS USED IN COLOR PROCESS REPRODUCTION
Filed April 20, 1961    2 Sheets-Sheet 1
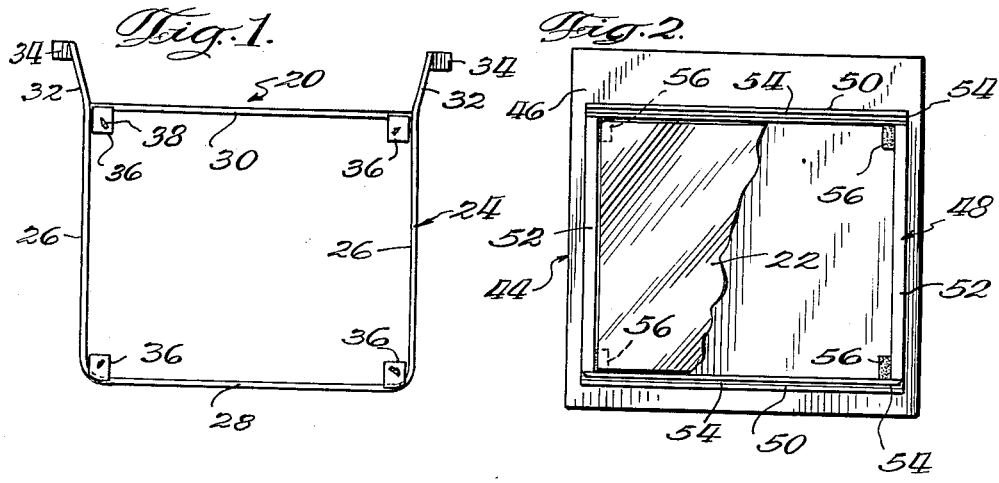
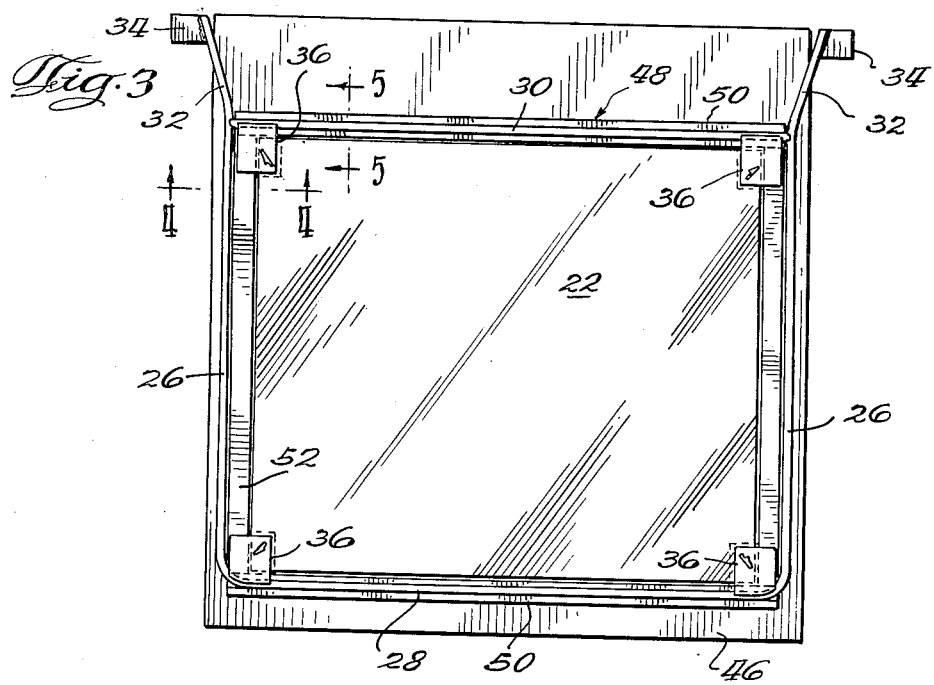
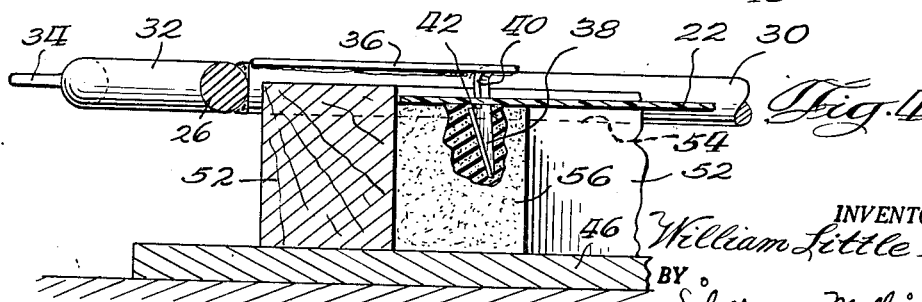
INVENTOR.
William Little III
BY
Silverman, Mullin & Case
Attorneys

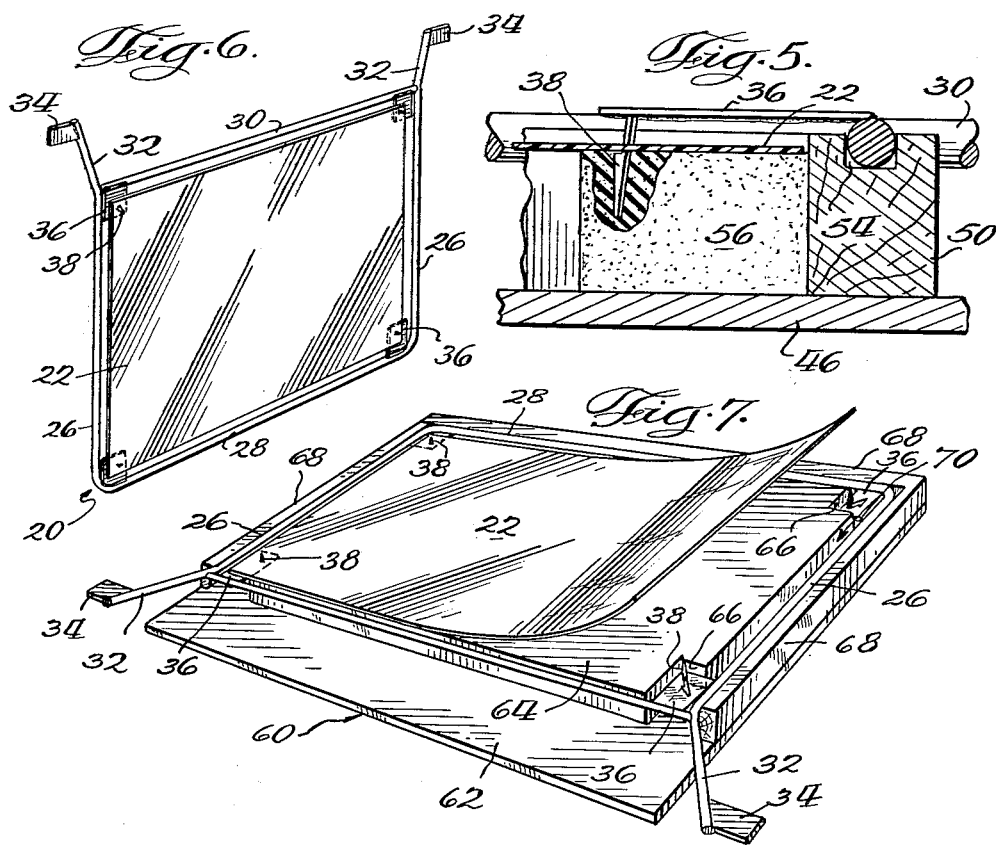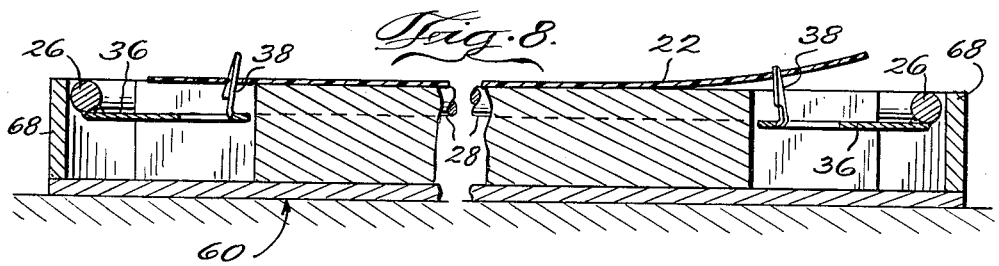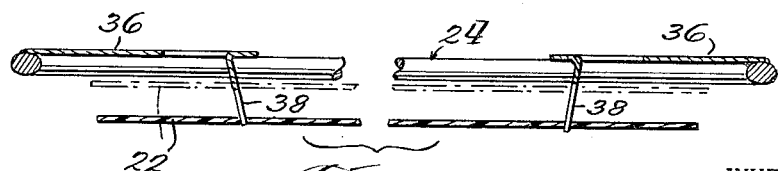

3,120,164
HOLDER FRAME AND JIG STRUCTURES FOR PHOTOGRAPHIC FILMS USED IN COLOR PROCESS REPRODUCTION
William Little III, 712 Glenwood Lane, Glenview, Ill.
Filed Apr. 20, 1961, Ser. No. 104,426
7 Claims. (Cl. 95—100)

This invention relates generally to the art of multiple color process reproduction by photolithography and photoengraving and more particularly, relates to novel holder frame and jig means for use in processing photographic films, such as used in color process reproduction and the like.

Although not limited thereto, the invention is concerned especially with the processing of color process pnotographs such as, separation negatives, color correction masks, and screen positives and negatives for making printing plates for full color reproductions. The color process photographs comprise sheets of transparent flexible film such as polyethylene terephthalate, known as Mylar, cellulose acetate, celluloid or the like and can be made directly from photographic color film. The subject to be reproduced in full color by a multi-color printing process such as photolithography or photogravure, initially is photographed using conventional photographic color film and a color positive is produced from the original negative. The color positive is the reference copy. Next, the color negative is selectively photographed using filter means in conjunction with the camera lens to exclude all of the unwanted colors and this is known as the color separation procedure to provide a black and white negative for each particular color of the color process to be folowed. In the four-color process, four color negatives are made, one each for yellow, red blue and black whereas in the three-color process, for economy in engraving and printing, the black color negative is omitted and the blue ink in varying shades is used in printing to obtain variation in shadows. Thus, the color separation procedure produces a separate photographic negative for each color involved and the colors are obtained by the inks used in printing.

After the color separation negatives have been produced, screen negatives and positives are produced which subsequently will be used in making the printing plates for reproduction in full color of the subject photographed by photolithograhy or photoengraving techniques. In order to distinguish from conventional color processing of photographic color film and the color process printing plates prepared for final printing either by photolithographic or photoengraving methods, the terms "color process film" or "color process sheet" will be used herein to designate the sheets of transparent flexible film made of cellulose acetate, celluloid, Mylar or the like such as separation negatives, color correction masks and screen positives or negatives from which the color process printing plates eventually are to be produced. However, the invention may be utilized successfully in photographic film processing other than color reproduction.

The production of color process films of the character with which the invention is concerned is carried out substantially in the dark or in the absence of photo-sensitive light. The color process films have to be subjected to various chemical baths and rinses in order to devlop and fix the latent image thereon. The processor holds the transparent color process film or sheet usually at the corners therof and introduces the sheet into the chemical baths successively exercising great care and caution not to scratch and mar the sensitized surface thereof or to buckle and crease the sheet in any way. Of course, the plastic film is very flexible and slippery to handle when wetted so that the task is increasingly complicated especially since it must be carried out in the dark. After the developing and fixing of the color process sheet, it must be dried. Heretofore, the practice has been to used some kind of drying frame possibly having spring clips for securing the color process sheet there-on or just clips or clamps supported in some way in a drying area and the color process sheet is suspended from said clips or clamps. Notwithstanding the great advances made in the printing art in the last twenty five years, the actual procedures employed for making the color process sheets have been manually executed primarily. Consequently, the procedure has been costly and time consuming, has resulted in a relatively large number of rejects and has required highly skilled and trained personnel even in connection with executing the relatively more menial steps in the process of making the color process sheets or films.

The holder frame and jig means embodying the invention is primarily directed toward that portion of the multicolor reproduction process concerned with developing and fixing the latent image on the color process sheets. In other words, the invention is not concerned with the color separation portion of the production of multi-color process plates but is concerned with the procedure immediately following color separation. At this stage, the color process film for each color is ready to be subjected to chemical baths or washes for developing and fixing the exposed areas thereof. Accordingly, it is a primary object of the invention to provide novel color process sheet holder frame and jig structures for use with said holder frame which will substantially eliminate the disadvantages hereinabove enumerated by obviating the need for the processor to touch said color process films when they are subjected to chemical treatment and later, when drying.

An important object of the invention is to provide a holder frame for a color process film of the character described which is constructed to permit the ready and convenient use thereof with jig structures both for mounting the color process film to the holder frame and for removing said color process film after it has been dried without requiring human contact therewith other than to a most limited and harmless extent.

Another important object of the invention is to provide a holder frame for a color process film for use in the manner described having novel means for automatically holding the color process film at the corners thereof under tension so as to maintain the said film taut on the frame. An ancilliary object of the invention is to provide said means as described which additionally is constructed to prevent inadvertent removal of the color process film from the holder frame during the time that the said process film is being subjected to chemical baths and is being dried.

In the co-pending application of W. Little III et al., Serial No. 158,324, filed December 11, 1961, now Patent No. 3,079,852, for the invention entitled Automatic Processing Apparatus for Color Process Films, there is described and claimed apparatus including a carriage arranged to be moved automatically in accordance with a predetermined program relative to a series of chemical baths into which a color process film is immersed sequentially. The carriage is provided with means for mounting a holder frame for a color process sheet and means for lowering and raising the holder frame with color process sheet installed thereon relative to each chemical bath of the series. The invention of the herein application, of which applicant herein is a co-inventor of the invention described and claimed in said co-pending application, has as another object thereof the provision of a holder frame for a color process sheet which is especially useful in connection with such automatic processing apparatus by reason of novel support means provided on said holder frame for installing the frame on such a carriage and permitting automatic removal of the frame from the carriage at the end of the cycle of operation of said automatic processing apparatus.

Another important object of the invention is to provide a holder frame for color process films comprising an open framework of substantially rectangular configuration, said framework having tapered members at each of the four corners thereof which cooperate to enable the color process film to be installed on the framework under tension applied in a direction outwardly of the corners and which have stop means so as prevent the color process film from being dislodged from the framework inadvertently.

Another object of the invention is to provide, in combination, a holder frame for a color process film and a jig or fixture for use with said holder frame for installing the color process film on the holder frame. An ancilliary object of the invention is to provide, in combination, a holder frame of the character described and a jig or fixture for removing the color process film from the holder frame.

Another object of the invention is to provide a holder frame of the character described having a pair of outwardly divergent support arms exterior of the open framework thereof, said support arms having means for suspending the holder frame easily and readily from a movable carriage of automatic processing apparatus for color process films or sheets and in which said support arms provide convenient handle portions for manipulating the holder frame in conjunction with either of said jigs or fixtures during mounting or removal of the color process film.

Other objects of the invention reside in the provision of a novel holder frame for color process films which is economical to manufacture; which is sturdy and resistant to chemicals ordinarily used in the photographic developing of the color process films; which is light in weight and convenient and easy to use; in the provision of novel jigs or fixtures as described for use with said holder frame which are economical and easy to manufacture and use; and in the provision of said holder frame and jigs or fixtures therefor which permit processing of the color process films without damaging, scratching, marring and the like of the films due to manual handling thereof as heretofore was the practice.

The foregoing and other objects of the invention will become apparent from the ensuing disclosure in which a preferred embodiment of the invention in its various cooperative phases has been described in detail in the specification and illustrated in the accompanying drawings. Minor variations in the size, arrangement, construction and proportions of the several parts thereof may occur to the skilled artisan without departing from the scope or sacrificing any of the advantages thereof.

In the drawings, wherein the same characters of reference are employed to designate the same or equivalent parts of the invention throughout the several figures thereof:

FIG. 1 is a top plan view of the holder frame embodying the invention.

FIG. 2 is a top plan view of the jig or fixture for use with said holder frame to install a color process sheet shown accommodated in said fixture.

FIG. 3 is a top plan view of said holder frame installed on the jig or fixture of FIG. 2 for installing a color process film on the holder frame.

FIG. 4 is a fragmentary sectional view taken along the line 4—4 of FIG. 3 and in the general direction indicated.

FIG. 5 is a fragmentary sectional view taken along the line 5—5 of FIG. 3 and in the general direction indicated.

FIG. 5A is a fragmentary diagrammatical view illustrating the positions of the holder frame and a process film during installation of the process film.

FIG. 6 is a perspective view of the holder frame having a color process film mounted thereto.

FIG. 7 is a top perspective view of the holder frame and a companion jig or fixture for removing a color process film from the frame.

FIG. 8 is a sectional view taken vertically through and transversely across the combined structure illustrated in FIG. 7.

Generally, the invention in its broadest application comprises a holder frame having an open framework the configuration of which is substantially similar to that of the color process film or sheet to be releasably secured therein and a fixture for use with said holder frame, said fixture having a central body portion also similar in configuration to the framework and the color process film. The holder frame and fixture can be cooperatively engaged to achieve a predetermined relative movement between selective portions of the color process film and the holder frame. In one instance, said movement results in the color process film being secured to the holder frame and in another instance, the color process film is released from the holder.

Referring now to the drawings, in FIG. 1, the reference character 20 designates generally the holder frame embodying the invention for a color process film or sheet 22 such as used in multi-color photolithographic reproduction processes. Said frame 20 is constructed to mount a color process film or sheet 22 as shown in FIG. 6 which comprises a rectangular sheet of transparent film such as cellulose acetate, celluloid or the like. The holder frame 20 has a substantially rectangular open framework 24 formed of wire of suitable gauge for obtaining desired rigidity and strength and of a metal resistant to the chemical reagents customarily employed in the developing and fixing of the image on the process plate. Preferably, the framework 24 may be constructed from a single length of stainless steel wire bent into a U-shaped configuration to provide the parallel side legs 26 and the connecting leg 28. The leg 30 opposite to and parallel with said connecting leg 28 is provided by another length of similar wire joined at its ends, as by welding, to the legs 26. Each of the side legs 26 has an extension 32 in the general plane thereof protruding beyond the leg 30, said extensions 32 being divergent outwardly one relative to the other and each terminating in a flat plate portion 34 extending outwardly. The extensions 32 with their plate portions 34 cooperate to provide mounting means for suspending the holder frame in a vertical position from a suitable support structure and also, suitable handle means for holding the holder frame during the installation or removal of the color process film, as will be explained subsequently herein.

It will be appreciated that the framework 24 and the color process film 22 are similar in configuration with the framework 24 being slightly larger in area than the process plate. Accordingly, where the configuration of the process plate varies from the illustrated form thereof, the configuration of the framework 24 likewise could be varied to achieve a similar configuration for both for the purpose of carrying out the principles of the invention.

Means for attaching the process film to the holder frame are provided at spaced locations adjacent the perimeter of the framework, or as shown, at the four corners of the framework 24. Said means each comprise a flat metal plate 36 having a barbed tine or prong 38 preferably punched or otherwise struck from the medial body portion of the plate. A plate 36 is secured, as by welding, at each corner of the framework and extending inwardly of the corner. Each of the tines or prongs has the barb formed by an undercut 40 adjacent the root thereof which extends a short distance from the juncture of the tine 38 with the plate 36 from which it is struck to provide a ledge or shoulder 42 intermediate said juncture and the tapered end of the tine. In operation, the tapered ends of the tines 38 permit the color process film to be pierced readily and once the process film has passed the shoulder 42, the shoulders 42 function as stop means to prevent the process film from being dislodged inadvertently from the framework.

Referring to FIG. 5A, it may be noted that each of the tines 38 is slanted inwardly relative to the framework 24; that is, considering a line perpendicular to the plate 36, the tine struck therefrom depends from the plate at an angle other than ninety degrees relative to the plate 36. Accordingly, the rectangular area which would be defined by a series of straight lines connecting the tapered ends of the tines 38 would be smaller than that defined by a series of lines joining the roots or at their junctures with the plates 36 respectively. Consequently, as the tines 38 are caused to pierce the color process film 22 and framework 24 moved toward the color process film 22, the process film 22 will be caused to ride up the tines toward the plates 36 and pulled outwardly at the corners thereof to stretch the color process sheet 22 and maintain the same under tension on the framework.

Illustrated in FIG. 2 is jig or fixture designated generally by the reference character 44 which is specially constructed for use with the holder frame 20 to mount or install a color process film 22 on said holder frame. Said fixture 44 has a flat base or pedestal 46 upstanding upon which is an open rectangular box formation 48 defined by the pairs of parallel walls 50 and 52 interconnected at right angles. The internal area defined by the walls 50 and 52 is slightly larger than that of the color process film 22 so as to permit the sheet or film 22 to be introduced flat into the box formation 48. The walls 50 are slightly shorter than the legs 28 and 30 of the holder frame and a longitudinally extending groove 54 is provided in the top face of each of the walls 50 coextensive therewith. The distance between the grooves 54 along their respective longitudinal axes is substantially identical to the distance between longitudinal axes of the legs 28 and 30. The grooves 54 are sufficiently large to permit the legs 28 and 30 to be seated therein for guiding the framework 24 into proper position on the box formation 48.

At each corner and on the interior of the formation 48 is secured a corner block 56 preferably formed of soft material such as wood or rubber. The upper surface of each block is spaced below the upper face of the formation 48 so as to provide support or ledge means for the color process film on the interior of the box formation 48. The distance below the upper face of the formation 48 at which the upper surfaces of the blocks 56 are spaced and the depth of the grooves 54 are selected to limit the distance it is desired the stakes or tines 38 to penetrate the color process film when the holder frame and fixture 44 are used conjointly to mount the color process film on the holder frame.

As seen from FIGS. 2 and 4, to use the holder frame 20 and fixture 44 conjointly, the color process film 22 first is introduced flat into the box formation 48 with its corners supported on blocks 56 on the interior of the box formation 48. The holder frame, held by the extension arms 32 by the processor, is poised over the fixture 44 with the tines 38 facing toward the color process film. Since the operation is normally conducted in the dark, the operator lowers the holder frame and, by feel, engages the legs 28 and 30 in the respective grooves 54 and the legs 26 exterior of the walls 52. Thus positioned, the tines 38 are located inwardly of the walls of the formation 48 and as the holder frame is depressed toward the color process film 22, the tines 38 will pierce the color process film adjacent the corners thereof. The blocks 56 support the process plate in proper position during piercing of the color process film by the tines. The tines 38 will continue to move downwardly in the blocks 56 until the process film rides past the shoulders 42 to seat in the undercut portions 40 of the tines. At the same time, as the color process sheet 22 rides up the tines 38 the corners of the sheet 22 are pulled outwardly due to the inwardly angled inclination of tines 38 and is held taut on the frame 20 when received in said undercut portions 40. The holder frame then can be lifted from the fixture 44 with the shoulders 42 preventing inadvertent removal of the color process film from the holder frame.

The holder frame with color process film installed can then be manipulated in a suitable manner for processing of the film 22, as desired, either by manual dipping into suitable tanks carrying chemical reagents or by suspending the holder frame on the carriage of automatic processing apparatus such as described and claimed in said co-pending application, all without touching the process film 22. The process film is retained taut on the frame 20 at all times as illustrated in FIG. 6 securely held in the corners thereof and in a plane substantially parallel to the plane of the framework 24.

Referring now to FIGS. 7 and 8, the reference character 60 designates generally a jig or fixture for use conjointly with the holder frame 20 for removing the color process film 22 from said holder frame. Said fixture 60 has a base or pedestal 62 upstanding upon which is a block formation 64 of rectangular configuration substantially complementary with that of the framework 24. Each of the four corners of the support 64 is notched or cutout as indicated at 66, the dimensions of each of the notches 62 being selected to permit a plate 36 of the holder frame to be accommodated therein. Guide rails 68 are secured on the base in a generally U-shaped configuration equally spaced from three sides of the block 64 to provide a continuous U-shaped track 70 the width of which is larger than the diameter of the wire from which the framework 24 is formed.

To remove the color process film 22, the holder frame is poised over the fixture 60 with the tines 38 thereof directed upwardly. The holder frame can be held by the extensions 32 and the legs 26, 28 and 30 are engaged in the track 70. Each of the plates 36 will be received in a notch 66 and as the holder frame is depressed further into the track 70, the color process film will be pressed against the block 64 except at the cutouts or notches 66. Pressure downwardly on the holder frame will cause the color process 22 to lift at the corners thereof and be disengaged from the tines 38, as shown in FIG. 7. All of the corners of the color process film may not be released from the tines simultaneously and if so, the sheet 22 may be stripped from the holder frame manually after one or more corners thereof do become disengaged.

Referring to FIG. 6, the holder frame 20 is shown in a vertical disposition with the color process film 22 releasably secured thereon. Attention is directed to the upwardly divergent extension arms 32 having the plates 34 extending in opposite directions. The plates 34 provide means for suspending the holder frame 20 from a carriage of automatic processing equipment such as shown in said co-pending application. Because the arms 32 are divergent, it can be seen that the holder frame can be lowered by such a carriage or other means to bring the arms 32 into engagement with camming surfaces for instance, to lift the holder frame from the carriage. For instance, said camming surfaces could be provided by vertical side walls confining a conveyor system, the distance between said walls being less than the distance between opposite medial portions of the arms 32. As the holder frame is lowered between said walls, the outside surfaces of the arms will ride upon the walls and the holder will be lifted or disengaged from the carriage to be deposited on the conveyor. Thus, the arms 32 provide handles for operation of the holder frame in conjunction with the fixtures 44 and 60 and also, camming means for disengaging the holder frame from other apparatus, such as the carriage of automatic processing equipment disclosed in said co-pending application.

Although the invention has been described in detail as applied to color process reproduction, it is not necessarily limited thereto in its application. It will be appreciated that the invention can be used in connection with any photographic film process wherein sheets of photographic film such as sheet 22 must be handled. For instance, the invention could be used in connection with certain black and white process reproduction with equal advantage.

It is believed that the invention has been described in sufficient detail to enable the skilled artisan to understand and practice the same. The invention has been pointed out distinctly in the appended claims in language intended to be broadly construed commensurate with the improvements contributed thereby.

What it is desired to secure by Letters Patent of the United States is:

1. A device for holding color process film or the like during the processing thereof comprising, a substantially rectangular open framework, supporting means secured to the periphery of the framework and extending exteriorly thereof, film impaling means located at each corner of and interiorly of said framework and extending downwardly therefrom for releasably securing a color process film in the framework under tension, each of said film impaling means comprising, a tine having a tapered edge facing outwardly from the film center, said tine extending inwardly of the framework at an angle less than 90°, said tines having stop means thereon for preventing dislodgement of the film after the same is pierced by said tines.

2. A device for holding color process film or the like as set forth in claim 1, including a plate member at each corner of said framework, said film impaling means being formed integral therewith.

3. A holder frame as described in claim 1 in which said support means comprise integral extensions of a pair of opposite sides of said framework, said extensions being angularly disposed relative to the sides of said framework and lying in the plane thereof.

4. A structure for use in processing photographic process film during the processing thereof comprising, a holder frame having an open, substantially rectangular, configuration substantially similar to the configuration of the process film, means at spaced locations adjacent the periphery of said holder frame for releasably securing the process film on the interior thereof under tension, said means comprising a tine located at each corner of said holder frame, each of said tines having a tapered edge facing outwardly from the holder frame center, said tines extending inwardly of the holder frame at an angle less than 90°, and a fixture having a body portion of a configuration substantially similar to that of both the process film and the holder frame, said body portion having means for supporting said film along marginal portions thereof and having an open center, said last named means comprising, resilient, rubber-like support members located at each corner of the body portion, said body portion being adapted to be cooperatively engaged with said holder frame to permit relative limited telescopic movement therebetween, said tapered tines adapted to pierce said film and resilient support members during said movement to impale the film at the corners thereof. and lying in the plane thereof.

5. A structure as described in claim 4 in which said body portion comprises a substantially open box-like formation, support means for said process film on the interior of the formation spaced below the top end of the formation and adapted to receive said first mentioned means, said formation having guide means in the top end thereof permitting said holder frame to be cooperatively engaged therewith causing said film to be impaled thereon and selectively moved toward said support means to secure said process film to the holder frame by said first mentioned means.

6. A structure as described in claim 4 in which said body portion comprises a block formation having notches at spaced apart locations along the perimeter thereof corresponding in spacial relationship one relative to the other to the spacing of said first mentioned means, said notches adapted to be matingly engaged with said first mentioned means and said block portion being adapted to engage the main body surface of said film to permit said movement whereby a process film secured to the holder frame can be released from said first mentioned means.

7. A structure as described in claim 4 in which said tapered members have stop means for preventing inadvertent release of the process film.

References Cited in the file of this patent

UNITED STATES PATENTS

| 1,113,288 | Barnes et al. | Oct. 13, 1914 |
| 1,413,208 | Waite | Apr. 18, 1922 |

FOREIGN PATENTS

| 529,275 | Germany | July 10, 1931 |

UNITED STATES PATENT OFFICE
CERTIFICATE OF CORRECTION

Patent No. 3,120,164                                  February 4, 1964

William Little III

It is hereby certified that error appears in the above numbered patent requiring correction and that the said Letters Patent should read as corrected below.

Column 1, line 34, for "fololwed" read -- followed --; column 8, line 13, strike out "and lying in the plane thereof.".

Signed and sealed this 23rd day of June 1964.

(SEAL)
Attest:

ERNEST W. SWIDER
Attesting Officer

EDWARD J. BRENNER
Commissioner of Patents